United States Patent [19]

McCabria

[11] Patent Number: 5,196,746
[45] Date of Patent: Mar. 23, 1993

[54] GENERATOR AUXILIARY FORCED COOLING AND LUBRICATION SYSTEM AND METHOD

[75] Inventor: Jack L. McCabria, Lima, Ohio

[73] Assignee: Sundstrand Corporation, Rockford, Ill.

[21] Appl. No.: 780,689

[22] Filed: Oct. 18, 1991

[51] Int. Cl.$^5$ .................... H02K 9/00; H02K 9/19; H02K 9/24
[52] U.S. Cl. ............................ 310/54; 310/58; 310/59
[58] Field of Search ............ 310/52, 54, 53, 58, 310/59, 60 R, 90, 114; 184/6, 6.12, 6.13, 6.22; 322/33, 34

[56] References Cited

U.S. PATENT DOCUMENTS

| | | | |
|---|---|---|---|
| 2,970,232 | 1/1961 | Kilbourne | 310/54 |
| 3,030,529 | 4/1962 | Jaeschke et al. | 310/53 |
| 3,089,969 | 5/1963 | Wiedemann | 310/53 |
| 3,835,919 | 9/1974 | Lambrecht et al. | 165/47 |
| 3,968,388 | 7/1976 | Lambrecht et al. | 310/53 |
| 4,002,224 | 1/1977 | Easter | 184/6.22 |
| 4,284,913 | 8/1981 | Barnhardt | 310/54 |
| 4,554,501 | 11/1985 | Baker | 322/29 |
| 4,717,000 | 1/1988 | Waddington et al. | 184/6.22 |
| 4,851,723 | 7/1989 | Barnhardt | 310/54 |
| 4,909,354 | 3/1990 | Fluegel | 184/6.12 |
| 4,953,663 | 9/1990 | Sugden | 310/58 |
| 5,034,638 | 7/1991 | McCabria | 310/54 |
| 5,139,055 | 8/1992 | Pollard | 141/1 |

Primary Examiner—Steven L. Stephan
Assistant Examiner—C. LaBalle
Attorney, Agent, or Firm—Michael S. Yatsko

[57] ABSTRACT

A generator system having an auxiliary forced cooling-oil lubrication system in which a second pump for the fluid is driven in a self sustaining cooling and lubricating cycle, despite the failure of a primary pump action. The second pump can be electrically or mechanically driven to cause a reserve portion of the cooling-oil lubricant to recycle from a secondary reservoir. This secondary reservoir reserves a fluid capacity not circulated by gravity feed in a primary fluid circulating path, which normally returns the fluid to a primary reservoir. A primary pump circulates the fluid through a primary portion of a heat exchanger with an oil-to-fuel heat exchange transfer to sustain the cooling and lubricating functions of the generator system and the failure mode, second pump sustains cooling operations of a permanent magnet generator, despite the failure of a primary pump or loss of fluid circulating in the primary circulation path.

12 Claims, 2 Drawing Sheets

GENERATOR AUXILIARY FORCED COOLING AND LUBRICATION SYSTEM AND METHOD

BACKGROUND OF THE INVENTION

This invention relates in general to generator cooling and lubrication systems, and more particularly, to aircraft generator, auxiliary pump mode, cooling-oil lubrication for generator units, operating during an extended interim without main power output from a failed generator unit, such as when primary pump cooling and lubricating components have insufficient pressure or when too little cooling-oil is present to function normally.

Aviation safety and dependability necessitates redundancy of electrical power generators, as well as, delayed replacement of same so that electrical power continues to be supplied to all vital functions, such as lights, fly-by-wire controls and computers operating without interruption, during relevant time periods, such as when crossing oceans and wilderness regions. Each engine of a multi-engined aircraft can be used to power a generator system with each generator system being capable of fulfilling the entire electrical power output needs for the aircraft, the power output being produced by the main field winding power generating section. A permanent magnet generator on the same rotor shaft as for the main power produces an auxiliary power output which is normally used by the control section of the generator when it is fully operational. As the number of engines declines, reliability must be increased, although, an auxiliary engine and generator may also be used for meeting the aircraft's electrical power needs. This is crucial if there is an emergency with no other remaining back-up propulsion power paired operative generator systems, but an auxiliary pair adds weight which is not without penalty.

Aircraft generator lubrication systems have heretofore comprised primary pump, multiple scavenging sections which circulate a cooing-oil fluid through a casing and return a predetermined quantity of the fluid lubricant to a central reservoir which serves combined drive and generator units in an integrated fashion. Intermediate filtering and cooling operations are performed on the cooling-oil lubricant in order to siphon-off contaminants and provide for a stable operating temperature while the main power field section of the generator unit is providing the operating load requirements for output electrical power.

A type of generator system which utilizes a constant speed drive transmission which interfaces with the propulsion engine, is known from U.S. Pat. No. 4,284,913, "Cooling Arrangement for and Integrated Drive-Generator System", and it is assigned to the same assignee as the present invention. A constant speed output shaft provides constant frequency electrical power from the generator system. A pair of scavenging pumps for the lubrication coolant fluid circulation is provided, with one pump located in the drive unit and another pump located in the generator unit, with a barrier breather therebetween. This refines the prior art constant speed generator arrangements which has the disposition of both pumps being located within the casing of a constant speed drive unit. This type of generator system, however, still presents excess weight that is introduced by the constant speed drive unit, although variable speed generator system (VSCF) significantly reduce this problem.

An aircraft VSCF electrical power generation system according to U.S. Pat. No. 4,554,501, entitled "Variable Speed Constant Frequency Power System With Auxiliary DC Output" is assigned to the same assignee as the present invention. It takes advantage of the inherent capabilities of a DC-link VSCF system to provide backup auxiliary DC power capability with little weight penalty. This type of generator, however, does not usually incorporate apparatus for mechanically disconnecting the rotating generator from the propulsion engine coupling when the generator has a pump failure or when there is a loss of cooling-oil fluid which renders the generator incapable of producing electrical power output. A variable speed generator is described in U.S. Pat. No. 4,851,723 entitled "Coolant Pump System for Variable Speed Generators", which is also assigned to the present assignee, in which a variable displacement pump is mounted within the generator housing and is mechanically coupled to the rotor such that the pump is driven at a speed proportional to the rotating speed of the generator rotor.

A faulty generator continues to rotate until it is disengaged which is usually when either the shear section for the rotating shaft fails or until it is feasible for the maintenance crew to remove the generator from the airplane engine. This means that it must be capable of rotating in a fault tolerant mode until it can be repaired or replaced with an operative spare unit after the flight is concluded and when a spare unit is available. A constant speed drive with an associated generator which can be disengaged, nearly doubles the number of the generator spares required because specialized maintenance tools are required to service the constant speed drive which results in maintenance time for the constant speed drive that is roughly double that for the VSCF generator.

A U.S. application Ser. No. 07/493,170, filed on Mar. 14, 1990, and now allowed, is entitled "Generator Auxiliary Mode Lubrication System and Method" and discloses a generator system adaptive, cooling-oil lubrication system and method of operating a generator system after a failure has occurred in the primary cooling and lubricating system. The generator system and components for fault mode rely on gravity feed and distribution from an auxiliary reservoir to the critical rotating components. Return of the cooing oil lubricant is by the spinning action of the non-power producing rotor of the generating unit in order to recirculate the cooling-oil fluid back to the auxiliary reservoir. This referenced allowed application Ser. No. 07/493,170 of mine is also assigned to the same assignee as the present application and is incorporated by reference into the present application, especially for its schematic showing of an exemplary VSCF generator system.

Aside from the major goal of obtaining continuous back-up or emergency power for fly-by-wire controls, computer driven displays of vital information, and lights for the aircraft, it is dependability of commercial service which sets the goals for positive pressure circulatory lubrication to be applied to the bearings of a faulty generator. Heat removal is also needed for power losses extracted from a reserve of cooling-oil lubricant that must be kept in circulation for at least three hours after a malfunction of the lubrication system, otherwise a permanent damage result is anticipated.

The commercial operator flying an aircraft with a faulty generator is fulfilling the power output requirements as long as there are backup generators aboard the flyable system, thereby operating with a minimal impact. Every time there is a pump failure or loss of the cooling-oil fluid by breakage or interruption of an oil line or passage in an electrical power generator, the complication to the air travel system is potentially immediate and may have consequential affects in both the short run and the long run.

SUMMARY OF THE INVENTION

In accordance with the present invention, a generator auxiliary forced cooling-oil lubricating system is provided for cooling a permanent magnet generator and lubricating vital rotating components such as bearings, gears, and seals during an extended failure interim when primary cooling-oil lubrication has ceased because of primary pump failure, loss of fluid or otherwise.

The inventive generator system auxiliary forced cooling-oil system is generally comprised of a compartment or casing which contains the components for the rotating electric power generator and a static components compartment which serves as a primary reservoir with components therein which may serve as a voltage converter for the generator. The primary reservoir is in fluid communication with the generator compartment, for containing cooling-oil lubricant which circulates back through an auxiliary reservoir compartment structurally integrated with the generator casing. The rotating generator is coupled to an engine such as a propulsion engine to produce electrical main and auxiliary power output with the auxiliary power output being produced by a permanent magnet generator section. A scavenging primary pump is coupled to the generator rotor shaft to draw the cooling-oil lubricant from the primary reservoir for cooling and lubricating functions during productive main section power generation. The cooling-oil lubricant, in the auxiliary reservoir, up to the level of a feed line for the primary reservoir, provides a ready reserve predetermined supply of fluid for a second pump means cooling-oil forced circulation path. This second or auxiliary circulation path becomes dominant in activity for a condition of main power down mode of the rotating generator resulting from primary pump shutdown or insufficient fluid. Otherwise, and normally, a cooling-oil level higher than the level of the feed line in the auxiliary reservoir passes through a line to the primary reservoir, from which it is pumped by the primary pump during normal power mode generation.

The auxiliary reservoir compartment, during a fault mode of the primary pump circulation path, supplies a plurality of second pump fed communicating passages to provide auxiliary cooling-oil lubricating forced circulation for the rotating generating unit. Lubrication and cooling of critical rotating components is thereby forced during a fault mode or non-power main section output to recycle the fluid through collecting passages in the casing to the residual reservoir. This is done in order to retard damage and destruction of vital rotating components for the coupled driving and generating units during an extended flight interim after the primary cooling and lubricating pump operations have ceased.

In accordance with another aspect of the invention, the second pump is driven through a coupling to a composite rotor assembly of a power generating section. The second pump is directly coupled to an electric motor which is energized from either a magnet generator deriving its power from the rotation of a permanent magnet armature section of the rotor producing an auxiliary power output or the power for the motor is taken from a multi-generator system bus. The second pump, alternatively, is gear driven without the electric motor, through a gear coupling drive meshing with a drive gear on the rotor shaft of the power generating section, when the main electric field section of the generator is shut down.

BRIEF DESCRIPTION OF THE DRAWINGS

The invention may be better understood, and further advantages and uses thereof more readily apparent, when considered in view of the following detailed description of exemplary embodiments taken with the accompanying drawings in which.

DETAILED DESCRIPTION OF THE PREFERRED EMBODIMENTS

The invention is a new and improved generator system adaptive, auxiliary forced cooling-oil lubrication system and a method of operating a generator system after a failure has occurred in the primary cooling and lubricating system for the generator and its associated components.

An aircraft generator of the variable speed constant frequency (VSCF) type is preferred for generating 110 volt AC multi- or three-phase power with a frequency of 400 Hertz. These common requirements are to be met abroad multi-engine aircraft of the jet propulsion type. The requirements are similar for both military and commercial operations, with the state of the art in systems technology being specially adapted to meet the disciplinary requirements for both of these regimes.

Constant speed drive generators (CSD) provide an alternative approach to constant frequency power generation aboard an aircraft, but these suffer an apparent weight penalty of approximately 80 pounds for each combined CSD and generator assembly when used to fulfill a unit of power generation required. This requirement is fulfilled more efficiently in terms of weight reduction by the VSCF unit.

The new and improved generator system, auxiliary forced cooling-oil lubrication system and method are described by illustrating only those parts of a VSCF generator system pertinent to the understanding of the invention and supplemental portions of the generator system are described in the incorporated-by-reference allowed U.S. patent application as assigned to the same assignee as thepresent invention.

Accordingly, a variable speed constant frequency power system provides a DC link pair of conductors from a variable speed generator connected to the output shaft of a propulsion engine operating throughout the spectrum of idle-to-cruise speeds. The DC-link converter inputs the DC voltage to an inverter which produces a three-phase output which is maintained at a constant 400 Hz for the power usage requirements of an aircraft. The three-phase output voltage and a grounded neutral are fed back through a monitor for voltage regulation in order to control the voltage of the input AC generator when the generator is operating within a speed range, of 2,000 to 28,000 revolutions per minute (rpm), considered normal for the VSCF generator which forms the basis of the present invention An exemplary 20 kVA system is described, although the present invention has been upgraded in the range of 30 to 50 kVA and is well suited for this purpose.

Figure 1:
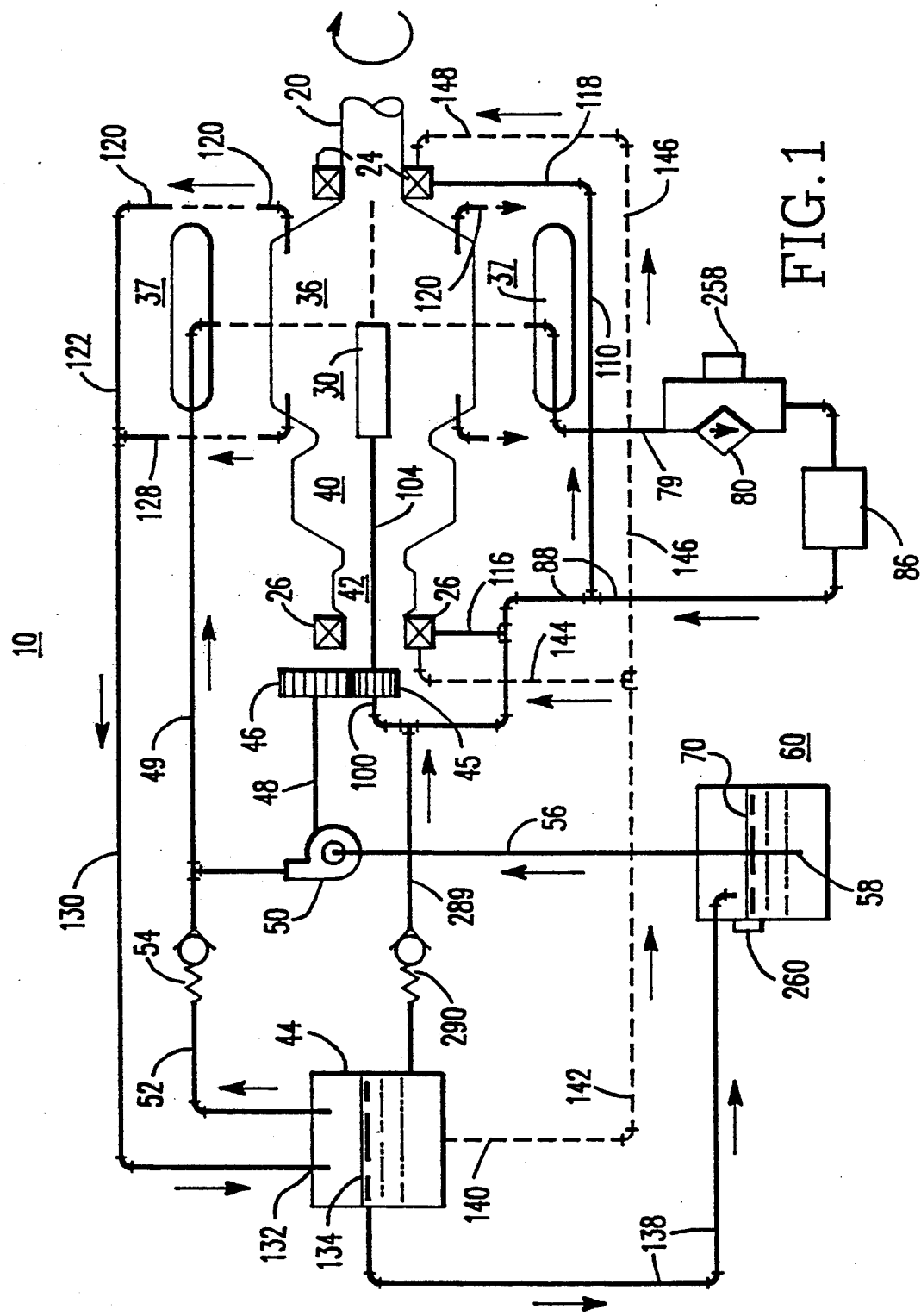
FIG. 1 is a functional schematic fluid flow diagram, of a generator system arrangement which traces in mirror image the fluid path relationships for the showing in FIG. 1 of the now-allowed, incorporated-by-reference U.S. application Ser. No. 07/493,170, shown therein as a cross-sectional elevational view of a variable speed generator with fault mode gravity feed distribution of cooling oil.

More specifically, FIG. 1 shows a fluid flow schematic diagram for a VSCF generator system of the previously disclosed invention transformed in mirror image from the functional block diagram of FIG. 1 of the U.S. application Ser. No. 07/493,170 which forms the primary components of the cooling-oil lubrication system integrated internally within the generator system 10, which is used as a basis of comparison for the teachings of the present lubrication system invention. The elemental fluid path connections are shown as pipe fittings in order to illustrate the functional path for fluid which assumes that a first or primary pump 50 is operative in order for fluid to traverse this pipe network. The first pump 50 which may be a georotor pump scavenges oil from beneath a fluid level 70 through a sump line 58, which is connected to a supply line 56 for a cooling-oil lubricant from a primary reservoir 60. The pumping action drives the fluid cooling-oil lubricant through a primary stator feed line 49 (not shown previously) and through an oil filter 80 before driving it through a heat exchanger 86, after which the cooling-oil lubricant is dispensed under pressure through supply line 88 and inlet line 100 to a rotor assembly 30. A central inlet line 104 makes the connection in the generator casing (not shown), and also the rotor bearing supply lines 116, 118 lead to the bearing 26 for the anti-drive end and the bearing 24 for the drive end. The rotor assembly 30 includes a rotor shaft mounted drive gear 45 which is used to drive a driven gear 46 for the first or primary pump 50 coupled with a shaft 48 to the drive gear 46, or a pinion drive may be used. The lubrication and cooling for the gears 45, 46 is shown to be through the inlet line 100.

The general arrangement in FIG. 1 is completed with the return path for the cooling-oil fluid lubricant in the generator 10 through the rotor thrust return passages 120, 122, 128 and the casing passages 130. A return passage aperture 132 leads into an auxiliary or residual reservoir 44 from which the cooling-oil level 134 is drained so as to pass into a return oil line 138, under the action of gravity, with respect to the relative positions of the reservoirs 44, 60. The oil is carried back into a primary reservoir 60 where it starts its normal circulation route and ends a circulation cycle.

A high pressure relief valve 54 (not previously shown) is connected between the auxiliary reservoir 44 and the primary stator feed line 49 at the junction formed at a "T" with a relief line 52 (not previously shown). This high pressure valve 54 acts to relieve the high pressure of a cold starting condition for the cooling-oil lubricant by opening in the direction towards the auxiliary reservoir. This permits the cooling-oil fluid to circulate through the path formed by the first pump 50, the relief valve 54 and line 52. The auxiliary reservoir 44, the return oil line 138, the primary reservoir 60, and the pump supply line 56 recirculate the oil until it is sufficiently warm and less viscous so as to reduce the pressure in order to easily flow in the primary stator feed line 49 and main stator winding cooling portions 37.

Similarly structured is a low pressure relief valve 290 connected between the auxiliary reservoir 44 and the inlet line 100 which is supplied by the primary supply line 88 from the heat exchanger 86. The low pressure relief valve 290 opens in the direction towards the auxiliary reservoir 44, when the line pressure reaches about 30 to 40 psi so as to divert some of the cooling-oil to bypass the bearings 24, 26 and rotor assembly 30 cooling system beyond this predetermined pressure limit. This is done in order to return the cooling oil to this reservoir when the primary pump pressure is higher than required to drive an adequate oil flow through the rotor assembly in the main circulation path. A splined drive shaft 20 is adapted to engage with an accessory gearbox (not shown) which is driven by a shaft of a propulsion engine such as would be found located on either wing mounted to an aircraft fuselage or in a tail section of a commercial or military aircraft with a multi-engine propulsion system. The direct gear coupling of the rotor assembly 30, it should be remembered, is not normally disengageable from the gear-driven shaft 20 of the engine gearbox coupled to the shaft of the propulsion engine during any flight regime.

The constant frequency generator 10 generates electrical power output with normal fluid pump operation and an adequate supply of cooling-oil lubricant in the fluid system. The gear coupling between rotor assembly 30 and the engine are operative to generate electrical power output. If the fluid pump 50, however, becomes inoperative or if there is a loss of oil in the system through a line or crack in the casing for the primary reservoir 60, or in one of the fluid connecting lines for the system, this prevents the pressurized circulation of the fluid oil in the primary cooling and lubricating system. Gravity flow or unpressurized circulation is delegated to take over with cooling-oil fluid circulation bypassing the primary reservoir 60 completely, since the level of oil 134 in the auxiliary reservoir 44 does not reach the outlet of the return oil line 138.

The auxiliary reservoir 44 is elevated with respect to the primary reservoir 60 in order to ensure that when the constant frequency generator 10 is operating in either an active power-producing mode of any capacity, or otherwise rotating without producing any power, there is a distribution of cooling-oil continuously by gravity for an extended period of time, with sufficient lubricating oil to prevent the destruction of bearings 24 and 26. There is a drain line 140 connected to a feed line 142 that follows a core passageway (not shown) by the action of gravity. Oil feeds into a gravity fed core passage 146 and fills a nearly vertical feed path 144 to reach the anti-drive end bearing 26. It also feeds oil through the passage 148 to reach the drive-end bearing 24 and the seal associated at each end of the rotor assembly 30.

The heat of the cooling-oil lubricant is exchanged with an abundant medium of exchange such as air or engine fuel, and in so doing, increases the temperature of the latter to a limited extent which may be beneficial to combustion.

The oil leaves supply line 104 under the centrifugal action of the rotor assembly 30 which causes the oil to spray through a plurality of circumferential apertures (not shown) at a location near the drive end of the rotor assembly 30. The mentioned apertures circumferentially communicate the pressurized lubricating oil in a radial outward fashion with the pressurized oil spraying the end-turns of a rotating field winding of a main field generating section 36 as the pressurized oil leaves this end of the rotor assembly.

The main stator winding cooling portion 37 peripherally surround the main field generating section 36 near the drive-end of the rotor assembly 30. The main field generating section 36 is comprised of a rotating field winding and a main stator winding which circumferentially surrounds the field winding portion. This winding pair produces a tremendous amount of heat when the VSCF generator 10 is rotationally operating in a power output mode. This mode is when the generator is being relied upon to produce the power for the electrical load requirements of the airplane. Similarly, there is heat production by the adjacent and more centrally located set of windings in the exciter winding generator section 40. This central winding pair 40 is comprised of a rotating exciter winding and an exciter stator winding which is used to produce AC currents on the rotor. The AC currents are fed through the rotor shaft to a rotating rectifier assembly within the rotor assembly 30 in order to provide DC power and to put DC current into the rotating field winding of the main field generating section 36. A permanent magnet generator (PMG) 42 provides electrical power for a control unit of the VSCF during main field power output, and the PMG is located circumferentially on the anti-drive end of the rotor assembly 30.

Cooling-oil leaves the rotor assembly 30 through the spaced circumferential rows of apertures in its surface (not shown) and sufficient energy is imparted to the oil to cause it to traverse passage lines 120, 122, 128 and 130 and into the auxiliary reservoir 44.

Failure of the first pump 50 or the loss of the oil in the primary reservoir 50 results in the loss of the principal cooling operation of the main field generation section 36 and main power generation. The exciter winding section 40 and the permanent magnet generator section 42 are likewise no longer cooled. The rotor assembly 30, including the rectifier assembly located within its core, no longer have the heat removed because of the loss of circulation of the cooling-oil lubricant through the oil lines and core passages. The heat is no longer dissipated through the heat exchanger path 86, as previously described after feeding in on line 79 through an oil filter 80, so not to function as a normally operative power output producing generator. A pressure drop switch 258 is associated with the oil filter 80 to give notice to a ground crew in order to change the filter.

Overheating will cause a trip to occur and this will shut down the power generation system. The rotation of the rotor assembly 30 continues with the need for cooling-oil lubrication for bearings 24 and 26. Friction and windage heating effects are also present, although they are relatively small in comparison to the heating load from the main field generating section of a functioning generator.

The teaching in the allowed incorporated-by-reference application Ser. No. 07/493,170 provides that when the pressurized oil system or primary pump 50 fails during flight operation, or with insufficient oil being left for operation in the primary reservoir 60, as determined by a static oil level sensor 260, there is still an adequate amount of oil in the auxiliary reservoir 44 to provide a positive gravity differential distribution or feed of about 10 or 20 cc/min of oil to lubricate the main bearings 24 and 26. This is achieved by gravity drain line passages 140, 142 and gravity feed passages 144, 146, and 148. The reserve oil supply seeps into the drain line 140 and feeds passages 142, 144 and 146, 148, and this occurs until all of the oil in the auxiliary reservoir falls below the bearing races 24, 26.

The oil is energized by dynamic action of the rotor imparting energy to the oil so that it leaves the rotor surface at a velocity sufficient to begin to traverse the core passages 120, 122, 128, and 130 back to the auxiliary reservoir 44. Oil from the return line passages 120, 122, 128, 130, is thus returned through passage aperture 132 to the auxiliary reservoir 44 by the action of the rotor. This recirculation of the reserve of oil from the auxiliary reservoir 44 may occur for an extended period of time which can exceed 100 hours of accumulated flying operations over a period of several days, although it does not provide any capability of power output of any sort during this extended period.

Figure 2:
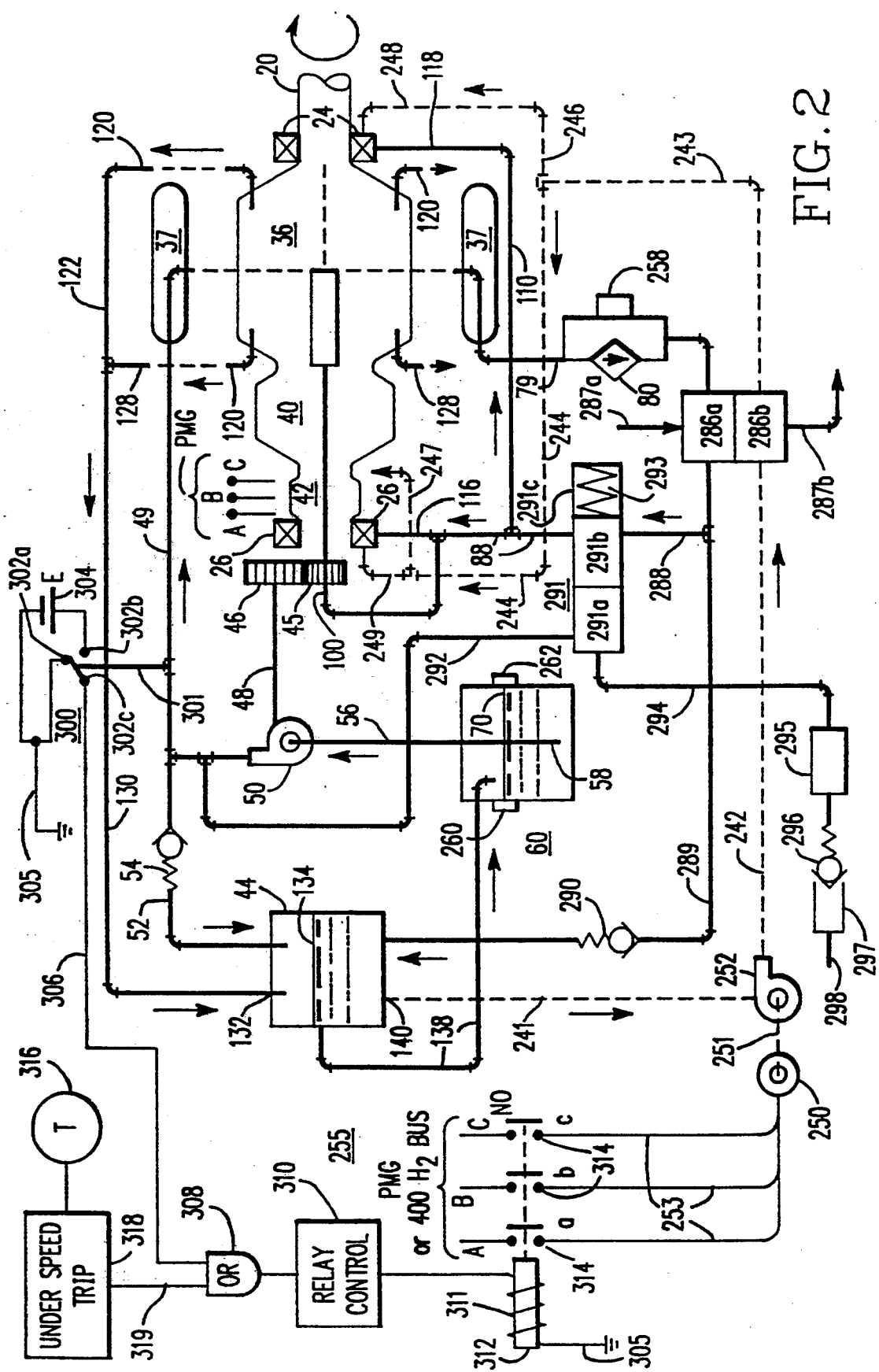
FIG. 2 is a functional electrical schematic and fluid flow diagram of a generator system arrangement, according to the present invention, with a fault mode second pump forced cooling-oil distribution from an auxiliary reservoir and positive feed to a primary pumped reservoir during normal operation.

The present invention is particularly suited to allowing full power extraction from the permanent magnet generator section PMG at terminals A, B, C shown in the functional electrical schematic and fluid flow diagram. This is shown in FIG. 2 of a VSCF generator system arrangement according to the present invention. There is a clear relationship between the structural and functional relationships of the present invention shown in FIG. 2 with the functional schematic fluid flow diagram of FIG. 1. An instant accounting is recognizable from the detailed similarity of features which is vividly displayed by the consistent application of the same reference numerals for lines and components. This serves not only to provide a direct comparison and instantaneous recognition of the disclosure portion of the present invention, but it avoids the need to repeat many of the relationships which may be drawn from the description of FIG. 1 herein.

The most instantly recognizable asset of the configuration shown in FIG. 2 is the presence of a second or auxiliary pump 252 which receives a supply of cooling-oil input from the auxiliary reservoir 44 on input feed line 241. The auxiliary pump 252 is driven by a three-phase electric motor 250 with a coupling shaft 251 providing the drive coupling therebetween. The pump motor 250 is energized by a set of motor input electric conductors 253a, 253b, 253c which ultimately receive the driving power from a three-phase source of voltage 255 as indicated at terminals A, B, C. This power may be input from the permanent magnet generator section 42 which generates an AC power output of a frequency which varies with rotational speed of the generator. Pump motor 250 has a rating of about 200 watts, and this is less than about 20% of the power generation capability of a variable speed permanent magnet generator output capability. This output, however, depends on the PMG being operated with a cooling-oil fluid flow in order to carry off the electrical heating effects from iron core losses which are additive to friction and windage mechanical power losses from rotor operation as in any power generation mode of operation.

The cooling-oil fluid output of the second or auxiliary pump 252 is through a feed line 242 in the direction of the arrow indicating entry into a heat exchanger auxiliary cavity portion 286b, which is the lower section of a primary heat exchanger cavity portion 286a which generally corresponds to the heat exchanger 86 described in FIG. 1. The primary cooling path 86 or 286a is used during normal operation in both configurations. Both of the heat exchanger cavity portions 286a, 286b are directly influenced by the heat exchange header with a fuel oil inlet 287a which passes successively through the primary heat exchange cavity portion 286a and the auxiliary heat exchange cavity portion 286b. There is no contamination of the cooling-oil fluid in the heat exchange header, and likewise the fuel does not become contaminated when reaching the fuel oil outlet 287b. The fuel oil egress from outlet 287b then passes directly on its way to a staging point for main power combustion in a propulsion turbine generally used to power aircraft.

The temperature of the fuel oil is regulated within predetermined limits by the adjustment of the rate of flow so as to serve as a preconditioning or prewarming function. This operation is useful as a supplement to the main contribution of power generation output of the PMG section 42 which can deliver about 2180 watts of electrical power at takeoff rpm's and is normally capable of providing between about 1200 watts at cruising speeds. The power consumption of the three-phase pump motor is about 200 watts of power consumption, with the net 1000 watts available at all times for critical flight conditions.

The cooling-oil fluid in a cooled state is output in the auxiliary output line 243 which feeds into a "T" splitter feed line input pair 244, 246, and this feeds the respective auxiliary feedlines for bearings. Specifically these are the anti-drive feedline 249 and the drive feedline 248 for the respective bearings 26 and 24. An auxiliary stator feedline 247 branches off from the anti-drive feedline 249 in order to provide cooling of the PMG stator portion as shown by the fluid arrow pointing upward directly under the permanent magnet generation section 42. This shows that forced cooling takes place as a direct result of the second or auxiliary pump 252 when it is electrically powered by the three-phase pump motor 250. This is not to be regarded as a concurrent supplement to the primary cooling recirculation function which is solely responsible for the normal cooling-oil circulation path when the main field generator section 36 operates in its normal power generating mode. The main power mode is with reliance on the exciter winding generator section 40 to produce AC currents on the rotor of the rotor assembly 30 and the PMG section 42 to provide electrical power for a control unit during main field power output of a normally excited VSCF generator.

The invention allows a de-excited main field generator to provide an adequate power output from the PMG section which remains coupled to an aircraft propulsion engine. An operating period of ten days or more can be anticipated after the loss of the oil in the primary reservoir 60 such as can be attributed to a severed oil line or due to a failure of the first or primary oil circulating pump 50. Operational switching of the PMG three-phase power output on terminals A, B, C is initiated from the control unit to the input 255 at the normally open (NO) relay contact pairs 314a, 314b, 314c of relay winding 311. The winding 311 is wound around the armature core 312 including a throw 313 to close the contacts for the three-phase winding conductors 253a, 253b, 253c when signaled to do so by a relay control circuit 310. This relay control 310 is also used to disconnect the generator control unit from the PMG section 42 after the main power section 36 has been de-energized, otherwise the generator system will electrically fail on its own because of over heating, which will cause a trip to occur. This trip will shut down the main power generating system but does not stop the continuing rotation of the rotor assembly 30 with permanent magnets associated with the PMG generating section 42.

A fluid pressure sensitive switch assembly 300 having normally open contact 302b and normally closed contact 302a is contacted by switch arm terminal contact 302c which is provided with a pressure switch input line 301. This switch assembly 300 monitors the primary stator feedline 49 for the pressure of cooling-oil therein which is a function of the pressure head of the primary or first pump 50. When the pressure of pump 50 falls below a predetermined value, the pressure switch assembly 300 senses this condition in terms of anticipating the overheating that will occur momentarily. A lack of cooling-oil fluid circulation will cause the transition of switch arm terminal contact 302c to drop from the normally closed contact 302a into contact position with the normally open contact 302b. The latter switch contact 302b provides a series circuit connection to a battery terminal voltage E of a battery 304 which has its negative terminal contact connected to ground potential 305 which ground is also directly connected to normally closed contact terminal 302a. The change of state from ground potential to a battery potential E on switch arm terminal 302c is directly input on a logic circuit input line 306 which is connected to one input terminal of a logic OR gate 308. The output of logic OR gate 308 forms an input connection to relay control circuit 310. The fluid pressure change in the stator feedline 49 is by this path directly communicated to the terminals of the auxiliary pump motor 250 causing it to be energized. The trip condition is for cooling-oil pressure falling below a predetermined value needed to sustain the cooling and lubricating functions of the main winding generator section 36. Providing the auxiliary power operating system includes the full power output of the PMG to be sustained either for delivering power to the airplane systems or directly to operate the pump motor 250. Power from the airplane bus can also be downloaded to the auxiliary pump motor 250, since by the direct route the power input is through the relay contacts 314a, 314b, 314c. It will be likewise accomplished in either way in accordance with one of the preferred embodiments of the present invention.

This approach to utilizing a fractional portion of the power output generation of the PMG section 42 lends itself with facility to the continuous auxiliary pump cooling and lubricating functions of the VSCF generator system. It is not indispensable to the invention that an electric pump motor be used since the motor assembly 30 provides a continuously rotating drive mechanism on the rotor shaft, and a secondary gearing arrangement or pinion for the auxiliary pump 252 similar to the first or primary pump 50, can be used. The facility of electrical switching is preferred for its relatively noiseless and pinion-free mode of operation, and it may be called upon for relatively short periods of pump motor 250 operation such as when checking out the generator system prior to take off and when it is actually needed as a replacement cooling and lubricating function for the main power mode of operation.

Another input to the logic OR gate 308 is delivered on input line 319 from an underspeed trip circuit 318 responsive to a tachometer 316 which provides an input proportional to the rotational speed of the rotor assembly 30. This input provides a direct indication of when the generator system is rotating above a set underspeed condition so that if the speed falls below the predetermined set condition, the logic OR gate 308 provides a signal to prevent the relay control circuit 310 from energizing the relay winding 311 to ground 305. Activating the switch contacts 314a, 314b, 314c to close, likewise provides power to the auxiliary pump motor 250 in order to drive the motor driven pump 252 for auxiliary cooling-oil circulation.

Another one of the feedline distinctions of the generator system arrangement shown in FIG. 2 which is not included or described in FIG. 1, is the provision of a bypass valve 291 which is connected at the output of the primary heat exchange cavity portion 286a. A primary circulation feedline input 288 and a primary output feedline 88 are connected through a central valve chamber 291b which is normally open to fluid passing therethrough. A piston therein is spring loaded by a spring 293 which occupies a right wing chamber 291c. A left-wing section 291a which is normally closed is moved to open under the pressure of cooling-oil fluid introduced from line 298 to a fitting 297 releasing an oil fill valve 296 with the oil passing through an oil filter screen 295, to an inlet line 294. The cooling-oil therein communicates with the left-wing chamber 291a in order to transition a plug residing therein to move to the right against the piston in the valve chamber 291b tensioned under the pressure of the spring load 291c. This introduces the cooling-oil fluid into the input fill line 292, thereby bypassing the primary pump 50 in order to fill the passages in the primary stator feedline 49, along with the heat exchanger cavity section 286a, the reservoirs 44, 60 and the plethora of connecting lines therebetween while preventing the filling of a rotor assembly cavity 30, which is typically must be initially cleared in liquid cooled electric generator apparatus. The bypass valve 291 does not form a part of the present invention since it has been described in U.S. Ser. No. 07/605,895, filed Oct. 30, 1990, and entitled "Liquid Cooled Electric Generating Apparatus and Method For Filling A Liquid Circulation System Therein", although it has been assigned to the same assignee as the present invention. In addition to a static oil level sensor 260, there is a remote oil level sensor 262 from the primary reservoir 60 to provide an indication of full, non-full, and overfilled.

The VSCF generator system is likely to overheat without the present invention because the environment proximate to the generator is normally not provided with the means for adequate heat rejection by convection and radiation. The generator would have to be de-coupled from the propulsion engine preferably from the cockpit of the aircraft in order to prevent the development of a hazardous condition which would jeopardize or be detrimental to the flight of the airplane and consequently undermines the safety of passengers and personnel aboard. This invention is especially suitable where a high temperature environment is predisposed to exist where the generator system is located. The new generation of aircraft tends to locate such generators adjacent to the core of the propulsion engine which is in a relatively hot region compared with a location for the generator system under the fan of a propulsion engine where there is cold air going through the fan region. The cooler location as opposed to the hot core location has been the preferred location in relatively older generation aircraft propulsion systems which are still deriving their usefulness in successful operation. There are design considerations, however, which sometimes prevent the cooler or "under the fan" location, especially when the amount of thrust per pound of engine weight incorporates the most compelling innovations in the art of engine and wind tunnel design and testing. An example of the engine core area ambient temperatures stated in the design for the Boeing 777 (formerly designated 767X) airplane at sea level is an ambient temperature of 46° C. (115° F.) and in the operating range of 182° C. (360° F.) with excursions to maximum temperature of 191° C. (376° F.) which occurs during take-off and climb flight activities.

Especially with these modern aircraft characteristics a need is imposed for auxiliary PMG power output operation with cooling-oil fluid circulation to dissipate the iron core losses. Nominal sustained electrical power consumption requirements on the order of magnitude of 200-240 watts, increasing to approximately 2180 watts at takeoff, can be dissipated through a forced auxiliary cooling path. This more significantly provides for a net power availability from the PMG for fly-by-wire emergency power situations providing about 1 kilowatt of electrical power for vital functions such as aircraft lighting, controls, indicators, and computers for controlling all the vital functions without interruption. This is especially important reserve power during relevant time periods including the crossing of oceans and wilderness regions, but most importantly insuring successful take-offs and climb-outs and landings.

While the present invention has been described with respect to a particular physical embodiment, the invention is not limited to the particulars described above; instead, the scope of the invention is defined by the following claims.

I claim:

1. A generator system adaptive, auxiliary forced cooling-oil lubrication system, comprising:
   a heat exchanger having primary and auxiliary cooling paths;
   a primary reservoir compartment and a power generation compartment in fluid communication with said primary reservoir compartment, said primary reservoir compartment being adapted for pressurizing cooling-oil through an oil line to said power generation compartment, said cooling-oil lubricant normally being passed through said primary heat exchanger path to dissipate heat;
   a power generation section of said power generation compartment including composite rotor means with a main rotor section and a permanent magnet section between the ends of a rotor shaft, said rotor shaft being supported by bearings and rotationally coupled to stationary means including a synchronously AC rotating main electric field winding section and a magnet generator winding section for producing main and auxiliary electrical power generation output for said power generation section;
   first pump means for scavenging the cooling-oil lubricant from said primary reservoir compartment in order to pressurize the cooling-oil lubricant for a forced entry passage to said power generation compartment, with return being to said primary reservoir during normal operational cooling and lubricating of vital rotational and electrical components of said power generation section, when fluid pressure in the forced entry passage is within an established operational range;
   a residual reservoir section of said power generation compartment in a casing adapted to normally cause a primary recirculated fluid passage of the cooling-oil lubricant from said first pump means, with return to said primary reservoir compartment, and to cause a secondary or auxiliary recirculated fluid passage of a reserve portion of cooling-oil lubricant through an auxiliary fluid passage, upon said first pump recirculation pressure failing to achieve a predetermined level;

second pump means adapted for pressurizing the cooling-oil lubricant from an auxiliary exit path from said residual reservoir section for the amount of the reserve quantity of cooling-oil lubricant remaining when the cooling-oil lubricant is no longer being pumped by said first pump means from said primary reservoir compartment;

said second pump means being coupled to said composite rotor means of said power generator section when fluid pressure from said first pump means falls below a predetermined minimum pressure in the input passage of said power generation compartment.

2. The generator system of claim 1, wherein said second pump means is being driven through a coupling to said composite rotor means of said power generating section.

3. The generator system of claim 2, wherein said second pump means is directly coupled to an electric motor means being energized by said magnet generator winding section auxiliary output for driving said second pump means when said main electric field section of said generator system is shut down.

4. The generator system of claim 2, wherein said second pump means is directly coupled to an electric motor means being energized on a multi-generator system electric power bus which drives said second pump means when said main electric field section of said generator system is shut down.

5. The generator system of claim 2, wherein said second pump means is gear driven through a gear coupling drive meshing with a drive gear on said rotor shaft of said composite rotor means of said power generating section.

6. The generator of claim 1, wherein said casing having a plurality of fluid communicating passages for distributing and collecting cooling-oil, under the pressure of said second pump means, so that a limited preselected auxiliary volume of cooling-oil lubricant flows in the passages through said auxiliary heat exchanger path so as to remove heat therefrom in order to cool and lubricate the power generation section and the vital rotational components of said power generating section.

7. The generator of claim 6, wherein the limited preselected auxiliary volume of cooling-oil fluid being normally reserved in relation to said major returnable fluid portion being utilized in the casing passages during normal fluid pressure operation of said power generation section, and the limited preselected auxiliary volume being available upon failure of the primary or main fluid path by forcing the fluid into auxiliary entry communicating passages during a fault or failure mode when the fluid pressure operation of said first pump means is diminished.

8. The generator system of claim 7, wherein said second pump means imparts a pressurization of the reserved portion of the cooling-oil lubricant from said residual reservoir section to replenish a substantial portion of said normal collecting fluid communication passages for continuously recollecting and redistributing the limited preselected auxiliary volume of cooling-oil lubricant from said residual reservoir.

9. The generator system of claim 8, wherein bypassing said primary reservoir return of cooling-oil is a function of the pressure in the normal entry passage from the primary reservoir, said pressure being diminished during a fault or failure mode of the normal forced circulation to vital rotational and nominal electrical components.

10. The generator of claim wherein said power generation section produces auxiliary electrical power through rotation of said magnet generating winding section in rotational coupling with said permanent magnet section on said rotor shaft, said auxiliary power being sufficient electrical power to provide for plural electrical second pump driving operation, with tandem failure mode cooling-oil operation of a plurality of aircraft generators which are provided with emergency cooling-oil lubrication, as well as sufficient electrical power in order to provide for flight critical operations.

11. The generator system of claim 1, wherein said second pump means includes an electrical motor drive, said power generation section of said power generation compartment includes a permanent magnet generator means being normally connected for supplying electrical power to a generator control unit, said permanent magnet generator means further being adopted to be connected for providing auxiliary electrical power for said electrical motor drive for said second pump means during the time when said first pump means no longer provides a predetermined fluid pressure in the forced entry passage.

12. The generator system of claim 1, wherein said heat exchanger means includes an external heat exchanger which functions to transfer the mechanical and electrical heat of the generator operation in both normal and auxiliary operating modes to the cooling-oil fluid through interfacing with an oil-to-fuel heat exchange transfer, said transfer beneficially prewarms the ambient fuel temperature of fuel delivered to a propulsion engine in which the fuel is burned.

* * * * *